March 15, 1927.
J. H. ASHBAUGH
1,621,050
REGULATOR SYSTEM
Filed May 28, 1925
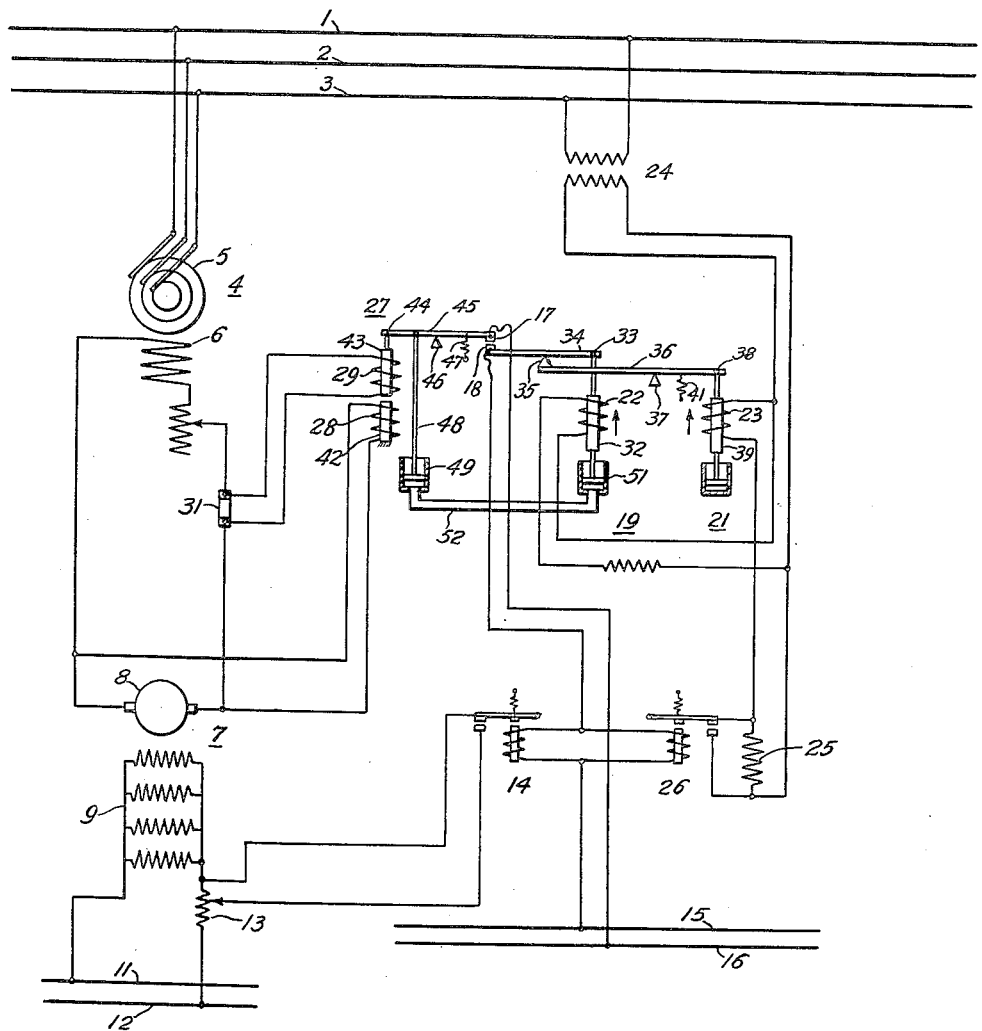
WITNESSES:
INVENTOR
John H. Ashbaugh
BY
ATTORNEY Patented Mar. 15, 1927.

1,621,050

UNITED STATES PATENT OFFICE.

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed May 28, 1925. Serial No. 33,339.

My invention relates to electric regulating systems and more particularly to regulator systems of the type in which the regulation is effected by rapidly opening and closing a circuit in shunt to a resistor located in the field-winding circuit of an exciter or other dynamo-electric machine.

One object of my invention is to provide a regulator of the above-indicated type that shall be quick-acting in its response to fluctuations of the regulated quantity.

Another object of my invention is to provide a regulator of the above-indicated character with a plurality of anti-hunting means, one of which is responsive to load conditions of the exciter.

In cases where large power systems are tied together through long transmission lines and a fault occurs, or when a large block of power is connected to, or disconnected from, the power circuit, it is necessary to vary the generator excitation and to make other adjustments in the system. It is desirable that such adjustments be made as rapidly as possible to prevent disturbances on the lines. When a short-circuit of the alternator occurs, a relatively heavy current, which is pulsating in character, is caused to flow through the alternator field circuit, by reason of the mutually inductive action of the alternator armature and field windings. With any increase of load upon the line, a similar action takes place, but of a less degree; and, in case the load on the line decreases, the reverse action will take place. Thus the variation in value of the field current is a measure of the load on the power circuit and may be utilized to modify the regulator action.

In the accompanying drawing, the single figure is a diagrammatic view of a regulator system organized in accordance with my invention.

Referring to the drawing, a power circuit or transmission line 1, 2, 3, may be directly or indirectly connected to an alternating-current generator 4, having an armature winding 5 and a field winding 6. The generator field winding is connected to an exciter 7, which is provided with an armature winding 8 and a field winding 9. The exciter field winding 9 is connected to be energized from any suitable source of direct-current power, such as conductors 11 and 12. I have found that best results may be obtained by the use of parallel-connected field-magnet windings, as disclosed in patent to C. A. Boddie 1,284,866 Nov. 12, 1918. In circuit with the exciter field winding is a resistor 13, and a relay 14 is connected to short-circuit any predetermined portion of the resistor when the relay contacts are closed. The operating winding of the relay 14 is connected to a suitable source of direct-current power, such as the conductors 15 and 16, and is adapted to be energized upon the closing of the main regulator contact members 17 and 18.

A control magnet 19 and an anti-hunting magnet 21 are provided with windings 22 and 23, respectively, which are energized in accordance with an electrical quantity of the power circuit (in this case, the voltage) through a shunt transformer 24 and are adapted to govern the regulator contact members. In circuit with the winding is a resistor 25, and a relay 26 is also provided and so connected as to short-circuit the resistor 25 when the relay contact members are closed. The relay 26 is thus included in the circuit through the main contact members 17 and 18. A third electromagnet 27 is provided for governing the contact members 17 and 18 and comprises a winding 28 that is so connected to the exciter as to be energized in accordance with the exciter voltage. The electromagnet 27 is also provided with a winding 29 that is connected across a shunt 31, which is in turn so connected in the exciter circuit that the coil 29 is energized in accordance with the current of the alternator field circuit.

The control magnet 19 is provided with a movable armature or core member 32 that is pivotally connected, at the point 33, to a lever 34, upon the opposite end of which the contact member 18 is carried. The lever 34 is supported upon a floating fulcrum 35 that is carried by one end of a lever 36, which is, in turn, mounted upon a fixed fulcrum 37, and is connected, through a pivot point 38, to a movable armature or core member 39 of the anti-hunting electromagnet 21. A spring tension member 41 is provided for normally biasing the righthand end of the lever 36 downwardly and acting against the force exerted by magnet 21.

The electromagnet 27 is provided with a stationary armature or core member 42 for the coil 28, and with a movable armature or core member 43 for the coil 29 that is connected through a pivot point 44 to one end of a lever 45, the other end of this lever carrying the contact member 17. A suitable fulcrum 46 is provided for the lever 45.

A spring member 47 is provided for normally biasing the contact member 17 downwardly and operates to oppose the action of the electromagnet 27.

The levers 45 and 34, which respectively carry the contact members 17 and 18, are flexibly connected together through the mechanical means of a rod 48 and dash-pots 49 and 51. These dash-pots are respectively associated with rod 48 and core 32 and are connected through hydraulic conveying means 52, which is filled with oil or other suitable fluid. The pistons of the dash pots 49 and 51 are sufficiently loose to provide for the passage of oil past the pistons, thereby making the hydraulic connection between these two members a yielding one and thus creating a reaction between the connected members that is temporary in character.

The operation of the regulator system is as follows. Assuming that an increased load occurs on the power circuit 1, 2, 3, thereby causing the voltage of the circuit to decrease, and the energization of the electromagnets 19 and 21 to be correspondingly reduced, the armature of the control magnet 19 will move downwardly, thereby raising the contact member 18 and tending to close or actually closing the circuit through the contact members 17 and 18. The armature of the anti-hunting electromagnet 21 will also be lowered, thereby raising the fulcrum point 35 and correspondingly raising the contact member 18. As the armature of the control magnet 19 is lowered, as a result of the decreased line voltage, the effect of the hydraulic connection between this magnet and the lever 45 will be to raise the rod 48, thereby lowering the contact member 17 and further tending to effect engagement of the contact members 17 and 18.

It will be apparent therefore that as the voltage of the transmission line is reduced, all three of the operating levers 34, 36 and 45 operate in a direction tending to cause engagement of the main regulator contact members 17 and 18.

Upon engagement of these regulator contact members, the relay 14 is operated to close its contact members and shunt the resistor 13, thereby increasing the excitation of the exciter field winding 9 and, consequently, the excitation of the main generator field winding 6, thus causing the voltage of the main generator to increase. The closing of the main regulator contact members will also cause the relay 26 to become energized, thus closing its contact members and shunting the resistor 25, thereby increasing the excitation of the winding 23 of the anti-hunting magnet 21. As the excitation of the winding 23 is increased, the armature 39 is caused to move in an upward direction, thus lowering the fulcrum 35 and, consequently, tending to disengage the contact members 17 and 18, to prevent an overtravel or excess of the regulating effect.

As the excitation of the main generator is increased, as a result of shunting the resistor 13, to correspondingly raise the voltage of the main circuit, the energization of the control magnet 19 and the anti-hunting magnet 21 will also be increased by reason of this change in voltage, and the cores of both of these magnets will be caused to move in an upward direction, the core 32 of control magnet 19 pivoting the lever 34 about the floating fulcrum 35, thereby moving the contact member 18 downwardly, and the anti-hunting magnet 21 pivoting the lever 36 about the fixed fulcrum 37, thereby moving the fulcrum 35 downwardly. The effect of an increase in voltage upon the power circuit is, therefore, to cause both of the magnets 19 and 21 to so operate as to move the contact member 18 downwardly, thus tending to disengage the contact members 17 and 18.

As the voltage of the exciter is raised, as a result of engagement of the contact member 17 and 18 as above described, the energization of the voltage winding 28 of the magnet 27 will be increased, thus tending to move the armature 29 downwardly and raise the contact member 17. This provides an additional anti-hunting means that is brought into operation as a result of the variation in voltage of the exciter 7 and is somewhat later in its action than the anti-hunting magnet 21.

Assuming that the decrease in voltage upon the line was caused by an increase in power demand, the increased load upon the generator 4 will cause, through the mutual induction of the alternator armature and field windings, an increased current flow in the alternator field circuit. This current will cause the energization of the current winding 29 of the magnet 27 to increase, thus further tending to lower the armature 43 and raise the contact member 17. The effect of this current coil is to provide an additional anti-hunting effect for the regulator, and the time-rate of increase of the current depends upon the time necessary for the increased load upon the generator to magnetize the armature and field winding thereof to produce the above-noted increase in field current. The current coil 29 thus compensates the action of the regulator for changes in the regulated quantity that are caused by changes in load upon the regulated machine.

As the power demand of the main circuit is decreased, causing a corresponding rise in voltage of the power circuit, the regulator action will be the reverse of that above described. Assuming that there is no power change upon the main circuit, the control magnet 19 and the anti-hunting magnet 21 will operate to maintain constant voltage upon the generator. and the magnet 27 will also be energized in accordance with voltage variations of the exciter as described, the three magnets cooperating to suitably govern the operation of the contact members 17 and 18.

I have found the above described regulator system to be very fast in its operation, and to be highly sensitive to voltage changes, so that, as conditions tending to produce a voltage change upon the line occur, the voltage will be brought back to its normal value in a much shorter time, and with a smaller variation from the desired value than with the use of existing regulators.

Many modifications may be made in my invention without departing from the spirit thereof, and I do not wish to be limited other than by the scope of the appended claims.

I claim as my invention:

1. An electric regulator comprising a pair of cooperating contact members, two levers for actuating one of said members, one of which levers is fulcrumed upon the other, actuating electromagnets for said levers, a third lever for actuating the other of said contact members, an electromagnet for actuating the last-named lever, and a yielding connection between certain of said electromagnets.

2. The combination with an electric circuit, a dynamo-electric machine associated therewith, and an exciter for the dynamo-electric machine, of a regulator comprising a pair of cooperating contact members, two governing electromagnets for said contact members, said electromagnets being energized in accordance with the voltage of said circuit, a third governing electromagnet for the contact members, said third electromagnet being energized in accordance with the current of the exciter circuit, and a yielding connection between the third-named electromagnet and one of the two first named electromagnets.

3. The combination with an electrical circuit, a dynamo-electric machine associated therewith, and an exciter for the dynamo-electric machine, of a regulator comprising a pair of cooperating contact members, a control electromagnet and an anti-hunting electromagnet for governing said members, said electromagnets being energized in accordance with the voltage of said circuit, the degree of energization of said anti-hunting electromagnet being further controlled by said contact members, a third governing electromagnet for the contact members, and a yielding connection between the third-named electromagnet and said control magnet.

4. An electric regulator comprising a pair of cooperating contact members, a pair of cooperating electromagnets for actuating one of said contact members, a third electromagnet for actuating the other of said contact members, and a yielding connection between the last-named electromagnet and one of the first-named electromagnets.

5. In combination with an electric circuit, a dynamo-electric machine associated therewith, and an exciter for said dynamo-electric machine, a regulator comprising a pair of cooperating contact members, three actuating electromagnets having core members for actuating the contact members, two of said electromagnets receiving current from said circuit, and the third electromagnet receiving current from said exciter, and a yielding connection between said third electromagnet and one of the remaining electromagnets.

6. An electric regulator comprising a pair of cooperating contact members, a pair of levers for actuating one of said contact members, a control electromagnet for actuating one of said levers and an anti-hunting electromagnet for actuating the other of said levers, a third electromagnet for actuating the other of said contact members, and a yielding connection between said third electromagnet and said control electromagnet for causing a temporary reaction therebetween.

7. The combination with an electric circuit, a dynamo-electric machine associated therewith, and an exciter for the dynamo-electric machine, of a regulator comprising a pair of cooperating contact members, two governing electromagnets for said contact members, said electromagnets being energized in accordance with the voltage of said circuit and a third governing electromagnet for the contact members, said third electromagnet being energized in accordance with the current and in accordance with voltage of the exciter circuit.

8. The combination with an electric circuit, a dynamo-electric machine associated therewith, and an exciter for the dynamo-electric machine, of a regulator comprising a pair of cooperating contact members, a plurality of means energized in accordance with an electrical condition of said circuit for actuating one of said contact members, means for modifying energization of one of said means in accordance with the operation of said contact members, means energized in accordance with the load on said exciter for actuating the other of said contact members, and means for connecting said contact members to temporarily react upon each other.

9. The combination with an electric circuit, a dynamo-electric machine associated therewith, and an exciter for the dynamo-electric machine, of a regulator comprising a pair of cooperating contact members, a control electromagnet and an anti-hunting electromagnet energized in accordance with an electrical condition of said circuit for governing said contact members, and an electromagnet energized in accordance with the voltage and the current of said exciter for governing said contact members.

In testimony whereof, I have hereunto subscribed my name this 22nd day of May, 1925.

JOHN H. ASHBAUGH.